United States Patent Office 3,010,915
Patented Nov. 28, 1961

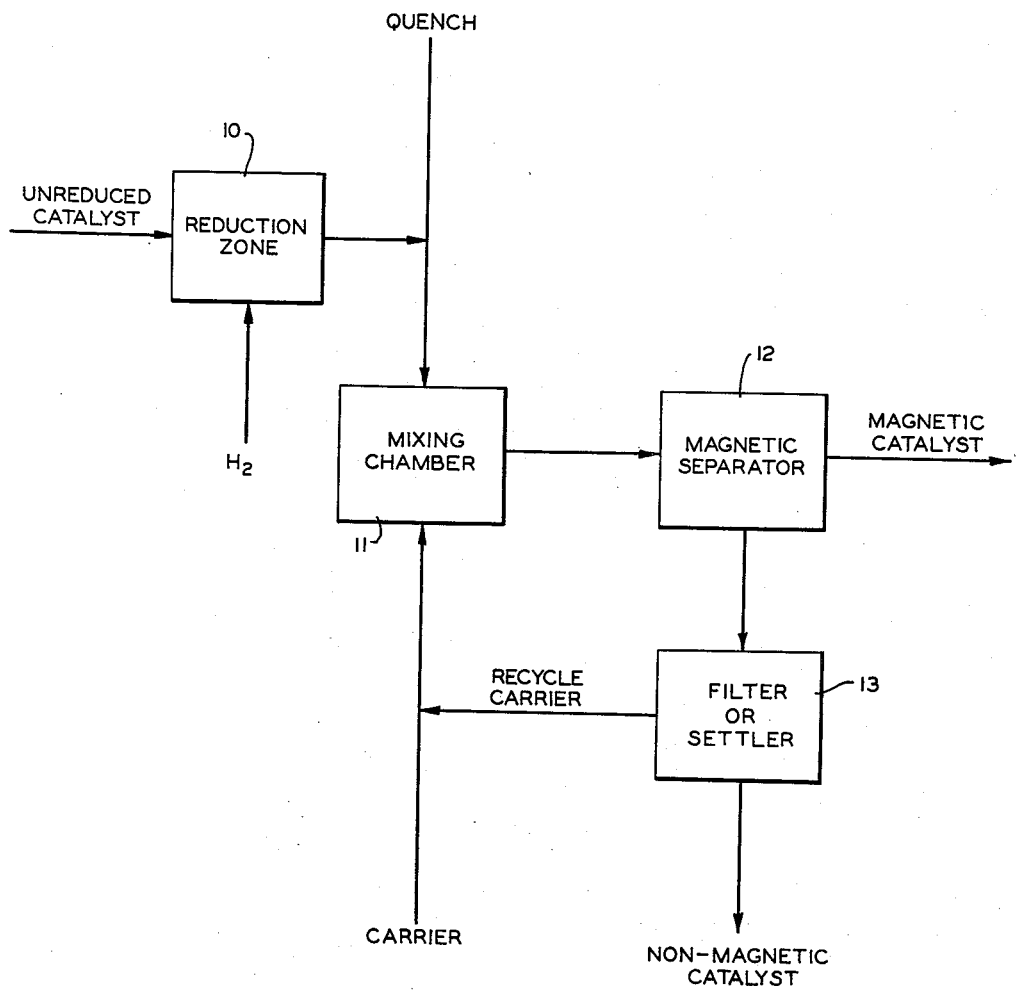
INVENTORS
B. O. BUELL
R. L. ARNETT
BY
ATTORNEYS

3,010,915
CATALYST PREPARATION
Barry O. Buell and Raymond L. Arnett, Bartlesville, Okla., assignors to Phillips Petroleum Company, a corporation of Delaware
Filed Oct. 25, 1954, Ser. No. 464,287
3 Claims. (Cl. 252—459)

This invention relates to a method of catalyst preparation. In a further aspect this invention relates to a process for preparing magnetic catalysts in order to simplify the problem of their removal from material in which they are used.

It is well known that catalysts prepared from iron, nickel, and cobalt are magnetic and one method of removing these catalysts from liquid material in which they are used is to pass the material through a magnetic field. With certain catalysts and from certain liquids this removal is a comparatively simple matter. However, when dealing with very finely divided catalysts and particularly with catalysts carried by a non-magnetic support, the complete removal of the catalyst is difficult. As an example of a catalyst of this type, there is the common hydrogenation catalyst, nickel-kieselguhr. In the preparation of this catalyst a nickel salt or hydroxide is disposed upon the kieselguhr and then the nickel is reduced by contact with a reducing agent, such as hydrogen. Preferred catalysts of this type have a particle size of 1 to 8 microns and this small size has posed a difficult removal problem when they are used for the solution hydrogenation of materials, the solutions having comparatively high viscosities. Separation by passing the liquid material containing the catalyst through a magnetic field has been used but this treatment does not remove all of the catalyst all of the time. Multiple separation steps are often successful but such a method of operation requires increased amounts of equipment and, therefore, increased expense in catalyst separation. It has been found that certain particles obtained following reduction of the catalyst are substantially unaffected by a magnetic field. These particles are believed to be ones which do not have any of the metal thereon or those wherein the metal thereon remains unreduced.

The following are objects of this invention.

An object of this invention is to provide a method by which the catalyst can be treated in order to simplify the problem of catalyst removal following its use. A further object of this invention is to provide a reduced nickel-kieselguhr catalyst which can be removed from a suspension by passage through a magnetic field.

Other objects and advantages of this invention will be apparent upon reading the specification.

Our invention is based upon the discovery that certain particles of the catalyst are not affected by the magnetic field. The invention involves a separation of these particles from those which are capable of being removed by means of a magnetic separation process.

The invention can best be understood by following the drawing accompanying and forming a part of this disclosure, this drawing showing, in diagrammatic form, the steps of this invention. Since the nickel-kieselguhr hydrogenation catalyst represents one of the more difficult catalysts to remove from suspension, it will be used in the following description. Furthermore, the invention is particularly directed to use of this catalyst for hydrogenation of rubbery polymers of conjugated dienes, such as butadiene. A process of using these catalysts for this hydrogenation is disclosed in Jones et al. application Serial No. 395,291, filed November 30, 1953, now U.S. Patent No. 2,864,809. This application relates to the production of thermoplastic materials obtained by hydrogenation of polybutadiene and copolymers of butadiene and styrene. In the process, the polymer, substantially free of salts or other hydrogenation inhibiting materials, is hydrogenated in the form of a solution or dispersion in a suitable solvent. Solvents used include saturated cyclic hydrocarbons such as cyclohexane, methylcyclohexane, decalin, and the like preferably boiling above atmospheric temperature. Aromatic hydrocarbons such as benzene and toluene; cyclic ethers, such as dioxane; and paraffinic hydrocarbons such as isooctane, isoheptanes and normal heptane; hydroaromatic hydrocarbons such as tetralin; and the like, can also be used. Where the solvent is unsaturated, it is usually at least partially hydrogenated in the process. Mixtures of solvents are sometimes used.

Solutions of these polymers are lyophilic colloids, that is the polymer has a very high affinity for the solvent. For this reason, it is necessary to operate with dilute solutions or dispersions, generally containing not more than 5 or 10%, on a weight basis, of the polymer in the solvent.

For the hydrogenation a slurry of reduced nickel-kieselguhr catalyst is mixed with a solution of the polymer and hydrogen is passed therethrough until the unsaturation of the polymer is reduced to the desired extent. Further details of the hydrogenation process are disclosed in the above-identified Jones et al. application.

Now attention is directed to the drawing wherein the catalyst preparation according to this invention is shown. The catalyst is first obtained in the unreduced state. This unreduced catalyst is placed in a reduction zone 10 where it is contacted with hydrogen at an elevated temperature. Most suitable for use in the hydrogenation process is a finely divided catalyst having a particle size between 1 and 8 microns which has been activated at a temperature between 500 and 800° F. for a period of several hours. A catalyst activated at 675° F. for 4 hours using approximately 100 volumes of hydrogen per volume of catalyst is generally used. Sometimes, considerably larger amounts of hydrogen are used, up to 1000 volumes of hydrogen per volume of catalyst. Following this reduction step, the catalyst is pyrophoric and must be maintained out of contact with oxygen. For this reason the catalyst is maintained under an atmosphere of hydrogen following reduction and is then quenched with a suitable suspension agent, methylcyclohexane being preferred in our operation, being inexpensive and readily available. Since a portion of the material used for the quench will be introduced into the hydrogenation zone, it is preferred that a saturated material be used in order that all of the hydrogen may be utilized for the hydrogenation of the polymer. However, stated in its broadest terms, the material used for the quench is any material which is a solvent for the polymer to be hydrogenated and the hydrogenated product. Therefore, the solvents set forth above for use in the hydrogenation can be used for this quench.

The amount of material used for this quench is, at a minimum, the amount which will cover the reduced catalyst. This nickel-kieselguhr catalyst is of comparatively low density, 250 grams occupying about one liter in the dry state. For 250 grams of catalyst, we generally use sufficient solvent to provide approximately 2 liters of catalyst slurry since this is the minimum amount of solvent which will give a slurry which can be handled in a pump. More can be used and the range of solvent generally varies from approximately 1 volume of solvent per volume of catalyst up to 5 volumes of solvent per volume of catalyst. Stated in another way, sufficient solvent is added to give a slurry containing 2 to 20 percent by weight of catalyst.

Following the addition of this quench the catalyst is introduced into a mixing chamber 11. Here it is mixed with a suitable carrier to provide a slurry suitable for introduction into a magnetic separator 12. This carrier can be a solvent such as those above set forth but it is greatly preferable to prepare a suspension in mixing chamber 11 corresponding to the characteristics of the material from which the catalyst must ultimately be removed. Thus, it will be apparent that viscous liquids are preferred. Another consideration in the choice of the carrier liquid involves the fact that the non-magnetic material must be removed later in the process, from the carrier. Preferred carriers include a solution of hydrogenated polybutadiene, hydrogenated rubber, polyisobutylene, polymethylmethacrylate, hydrocarbon oils, and melted paraffin. Unhydrogenated polybutadiene can be used and it is sometimes desirable to use a portion of the polymer to be hydrogenated in the process of our invention. The amount of this carrier is preferably sufficient to provide a viscous solution similar to the hydrogenated product and, therefore, dilute solutions containing 1 to 5 or 10% of the polymer in a solvent are frequently used. This percentage sometimes goes as high as 25 weight percent. The amount of carrier added depends upon the amount of material used to quench the reduced catalyst.

The structure of magnetic separator 12 does not constitute a part of this invention and can be of the various types known to the art. Suitable separators are shown in the following applications: Piety Serial No. 427,903 and Arnett et al. Serial No. 427,949, both of these applications having been filed on May 6, 1954, and now U.S. Patent Nos. 2,754,000 and 2,760,638, respectively. Prior to introduction into magnetic separator 12, it is desirable to have a uniform dispersion of the catalyst in the carrier. For this reason, it is generally desirable to provide mixing apparatus associated with chamber 11. A simple agitator is generally sufficient. Since the catalyst is generally removed from the product while the product is maintained at an elevated temperature, it is frequently desirable to heat the slurry in chamber 11 prior to separation in the magnetic separator. Separator 12 removes magnetic catalyst from the slurry and this catalyst is suitable for use in the hydrogenation process. Since this catalyst has once been removed by the magnetic separator it can again be removed from the polymer solution following hydrogenation of the polymer. The problem of removal of difficultly removable catalysts is no longer present because the non-magnetic particles have been removed prior to the hydrogenation step.

The balance of the material coming from the magnetic separator is passed to a filter or settler 13. This comprises any type of apparatus suitable for separation of the non-magnetic material from the solution. It can be a filter press, a centrifuge, or other separation means. Since the amount of non-magnetic material contained in the carrier at this step of the operation is comparatively small, such means of separation are feasible where they would not be feasible where dealing with the large volume of material.

The amount of non-magnetic catalyst material removed depends upon the process of preparation of the catalyst but is seldom over 10% of the amount of unreduced catalyst used as a starting material and at times is as small as 1%. Usually, 3 to 5% of the catalyst is removed as non-magnetic material.

From the filter or settler 13 the carrier is recycled to the mixing chamber 11, makeup carrier being supplied as needed. A very small amount of carrier is lost in the filter or settler but this amounts to only a fraction of 1%.

Thus it is apparent that we have solved the problem of catalyst removal from the solution of hydrogenated polymer by never introducing this material into the solution of the material which is to be hydrogenated. Presence of a very small amount of catalyst in the ultimate product results in an off-color product and one which is subject to faster deterioration upon aging. It is preferable to have the product contain less than 0.05 weight percent of the catalyst and, for this reason, it is easily seen that the added ease of removal of catalyst provided by our invention improves the product.

As a specific example of a process, 60 grams of nickel hydroxide on kieselguhr was reduced with hydrogen at 650° F. for 4 hours. This reduced catalyst was quenched with 500 cc. of methylcyclohexane. Mixed with this quenched catalyst was 228 grams of polybutadiene dispersed in 400 cc. of methylcyclohexane as the carrier. When this mixture is passed through the magnetic separator the magnetic catalyst was removed and used for hydrogenation in subsequent operation. The carrier, with the non-magnetic catalyst, was fed to a settler and the non-magnetic catalyst removed therefrom. The carrier was then recycled to the mixing chamber for use with an additional quantity of catalyst. The magnetic catalyst removed in this way can be easily removed from a solution of hydrogenated polybutadiene.

The reduced nickel content of this nickel-kieselguhr catalyst is generally in the range of 10 to 50% of the total nickel in the reduced state, although in some instances the reduced nickel content may amount to as much as 75% of the nickel.

Hydrocarbon oils are quite suitable for use in this process as the carrier, the preferred oils having a low viscosity index, that is oils which exhibit a large change in viscosity with change in temperature. When using such oils, the usual procedure is to pass the slurry of catalyst in the oil through the magnetic separator at a fairly low temperature and to heat the oil containing the non-magnetic catalyst in the settler. This permits removal of the solid catalyst in a shorter time.

As will be evident to those skilled in the art, various modifications of this invention can be made in the light of the foregoing disclosure without departing from the scope of the invention.

We claim:

1. A process for preparing a reduced nickel-kieselguhr catalyst suitable for use in a hydrogenation process, comprising, reducing said catalyst by contacting same with a stream of hydrogen at an elevated temperature, quenching said catalyst, mixing said catalyst with a liquid carrier in a mixing zone, no reaction taking place in said mixing zone, passing the mixture of said catalyst and said carrier through a magnetic separation zone, recovering magnetic catalyst from said magnetic separation zone, passing non-magnetic material from said magnetic separation zone to a non-magnetic separation zone, separating and discarding non-magnetic catalyst, and recycling uncontaminated carrier to said mixing zone.

2. A process for preparing a reducing nickel-kieselguhr catalyst having a particle size of 1 to 8 microns for use in hydrogenating a solution of polybutadiene, comprising, reducing said catalyst by contacting said catalyst with 100–1000 volumes of hydrogen per volume to catalyst at a temperature of 500 to 800° F., quenching said catalyst, mixing said catalyst with a liquid carrier in a mixing zone, no reaction taking place in said mixing zone, passing the mixture of said catalyst and said carrier through a magnetic separation zone, recovering magnetic catalyst from said magnetic separation zone, passing non-magnetic material from said magnetic separation zone to a non-magnetic separation zone, separating and discarding non-magnetic catalyst, and recycling uncontaminated carrier to said mixing zone.

3. A process for preparing a reduced nickel-kieselguhr catalyst suitable for use in a hydrogenation process, comprising, reducing said catalyst by contacting same with a stream of hydrogen at an elevated temperature, quenching said catalyst, mixing said catalyst with a liquid hydrocarbon carrier in a mixing zone, said liquid hydrocarbon having a low viscosity index, no reaction taking place in said mixing zone, passing the mixture of said catalyst and said carrier through a magnetic separation zone, recovering magnetic catalyst from said magnetic separation zone, passing non-magnetic material from said magnetic separation zone to a non-magnetic separation zone operated at a higher temperature than said magnetic separation zone, separating and discarding non-magnetic catalyst, and recycling uncontaminated carrier to said mixing zone.

References Cited in the file of this patent

UNITED STATES PATENTS

| | | |
|---|---|---|
| 1,390,688 | Ellis | Sept. 13, 1921 |
| 1,937,489 | Jenness | Nov. 28, 1933 |
| 2,139,602 | Raney | Dec. 6, 1938 |
| 2,264,756 | Johnston et al. | Dec. 2, 1941 |